(12) United States Patent
Fang et al.

(10) Patent No.: US 6,928,398 B1
(45) Date of Patent: Aug. 9, 2005

(54) SYSTEM AND METHOD FOR BUILDING A TIME SERIES MODEL

(75) Inventors: Dongping Fang, Lisle, IL (US); Ruey S. Tsay, Chicago, IL (US)

(73) Assignee: SPSS, Inc., Chicago, IL (US)

( * ) Notice: Subject to any disclaimer, the term of this patent is extended or adjusted under 35 U.S.C. 154(b) by 696 days.

(21) Appl. No.: 09/710,401

(22) Filed: Nov. 9, 2000

(51) Int. Cl.[7] .............................................. G06F 17/10
(52) U.S. Cl. .................................. 703/2; 703/6; 700/30
(58) Field of Search ........................ 703/2, 6; 706/26; 700/29, 30; 701/31

(56) References Cited

U.S. PATENT DOCUMENTS

| | | | | |
|---|---|---|---|---|
| 5,835,902 A | * | 11/1998 | Jannarone ..................... | 706/26 |
| 5,884,037 A | * | 3/1999 | Aras et al. ................... | 709/226 |
| 6,216,154 B1 | * | 4/2001 | Altschuler et al. .......... | 709/203 |
| 6,611,726 B1 | * | 8/2003 | Crosswhite .................. | 700/99 |

OTHER PUBLICATIONS

Gomez, V. and Maravall, A., (1998), Automatic Modeling Methods for the Univariate Series, pp. 1–45.

Tiao, G.C. and Tsay, S.R., (1983), Consistency Properties of Least Squares Estimates of Autoregressive Parameters in Arma Model, Journal of the American Statistical Association, vol. 11, No. 3, pp. 856–871.

Tsay, S.R. and Tiao, C.G., (1984), Consistent Estimates of Autoregressive Parameter and Extended of Sample Autocorrelation Function for Stationary and Nonstationary ARMA Models, Journal of the American Statistical Association, vol. 79, No. 385, pp., 84–96.

Dickey, D.A. and Fuller,W. A., (1979), Distribution of the Estimators for Autoregressive Time Series With a Unit Root, Journal of the American Statistical Association, vol. 74, No. 366, pp. 427–431.

Dickey, D.A., Hasza, D.P. and Fuller, W.A., (1994), Testing for Unit Roots in Seasonal Time Series, Journal of the American Statistical Association, vol. 79, No. 386, pp. 355–367.

Dickey, D.A. and Pantula, S.G., (1987), Determining the Order of Differencing in Autoregressive Processes, Journal of Business and Economic Statistics, vol. 5, No. 4, pp. 455–461.

Phillips, P. and Perron, P., (1988), Testing for a Unit Root in Time Series Regression, Biometrika, vol. 75, No. 2, pp. 355–346.

(Continued)

*Primary Examiner*—Albert W. Paladini
(74) *Attorney, Agent, or Firm*—Ryndak & Suri

(57) ABSTRACT

A method and computer system is provided for automatically constructing a time series model for the time series to be forecasted. The constructed model can be either a univariate ARIMA model or a multivariate ARIMA model, depending upon whether predictors, interventions or events are inputted in the system along with the series to be forecasted. The method of constructing a univariate ARIMA model comprises the steps of imputing missing values of the time series inputted; finding the proper transformation for positive time series; determining differencing orders; determining non-seasonal AR and MA orders by pattern detection; building an initial model; estimating and modifying the model iteratively. The method of constructing a multivariate ARIMA model comprises the steps of finding a univariate ARIMA model for the time series to be forecasted by the method of constructing a univariate model; applying the transformation found in the univariate model to all positive time series including the series to be forecasted and predictors; applying differencing orders found in the univariate model to all time series including the series to be forecasted, predictors, interventions and events; deleting selected predictors and further differencing other predictors; building an initial model wherein its disturbance series follows an ARMA model with AR and MA orders found in the univariate model; estimating and modifying the model iteratively.

36 Claims, 7 Drawing Sheets

OTHER PUBLICATIONS

Scienific Computing Associates, Modeling and Forcasting Time Series Using Sca–Expert Capabilities, pp. 47–57.

Business Forecast Systems, Forecast PRO For Windows, pp. 116.

"SAS/ETS Software: Time Series Forecasting System," SAS Institute Inc., Version 6, First Edition, pp. 140–177.

Armstrong, S.J., and Collopy, F., "For Novices: Answers to Frequently Asked Questions," Forecasting Principles, pp. 1–10.

For Researchers in Forecasting, Forecasting Prinicples, pp. 1–2.

Yurklewicz, J., (1996), "Forecasting Software Survey: Guide to a Fast–Growing Discipline: How to Identify the Appropriate Product For Your Needs," OR/MS Today, vol. 23, No. 6, pp. 1–4.

(1998), Forecasting Software Survey, OR/MS Today, pp. 1–3.

Cho, M.Y., Hwang, J.C., Chen, C.S., Customer Short Term Load Forecasting by Using ARIMA Transfer Function Model, Energy Management and Power Delivery, 1995, vol. 1, pp. 317–322.

Fouskitakis, G.N., Fassois, S.D., Pseudolinear Estimation of Fractionally Intergrated Arma (ARFIMA) Model with Automotive Application, IEEE Tranactions on Signal Processing, Dec. 1999, vol. 47, Issue 12, pp. 3365–3380.

* cited by examiner

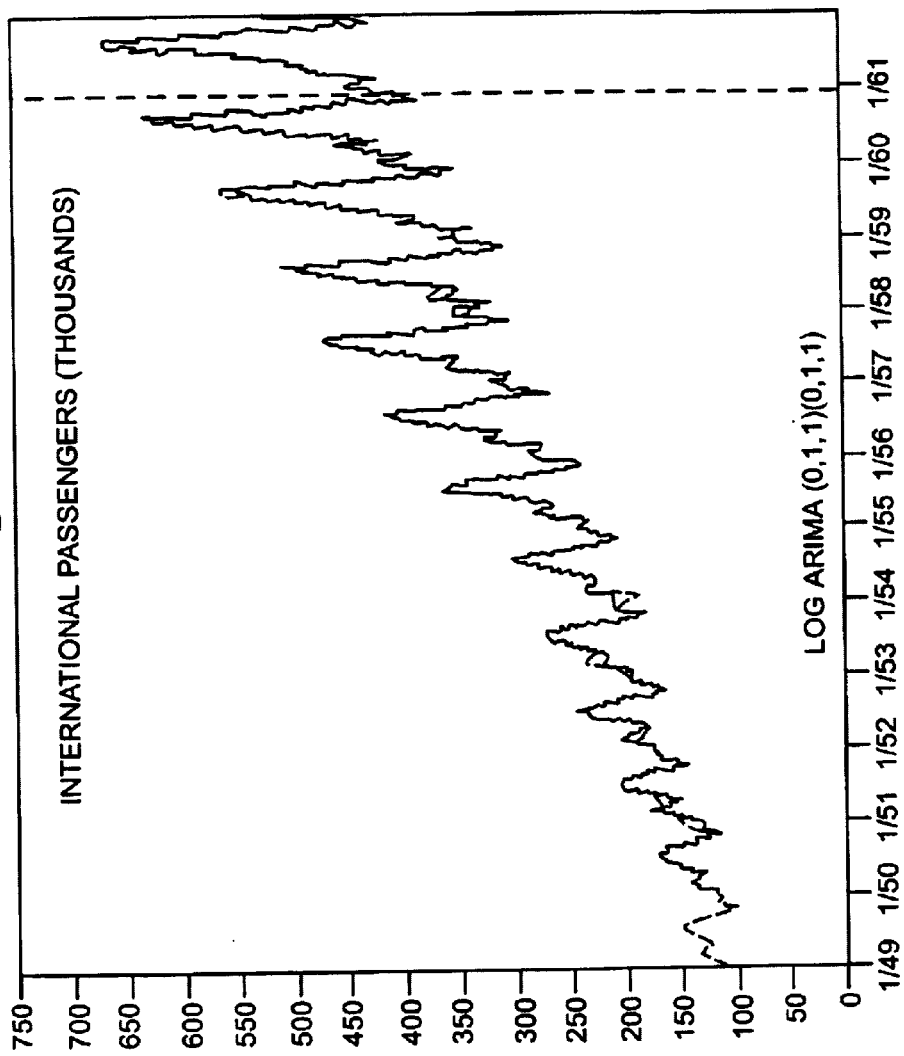

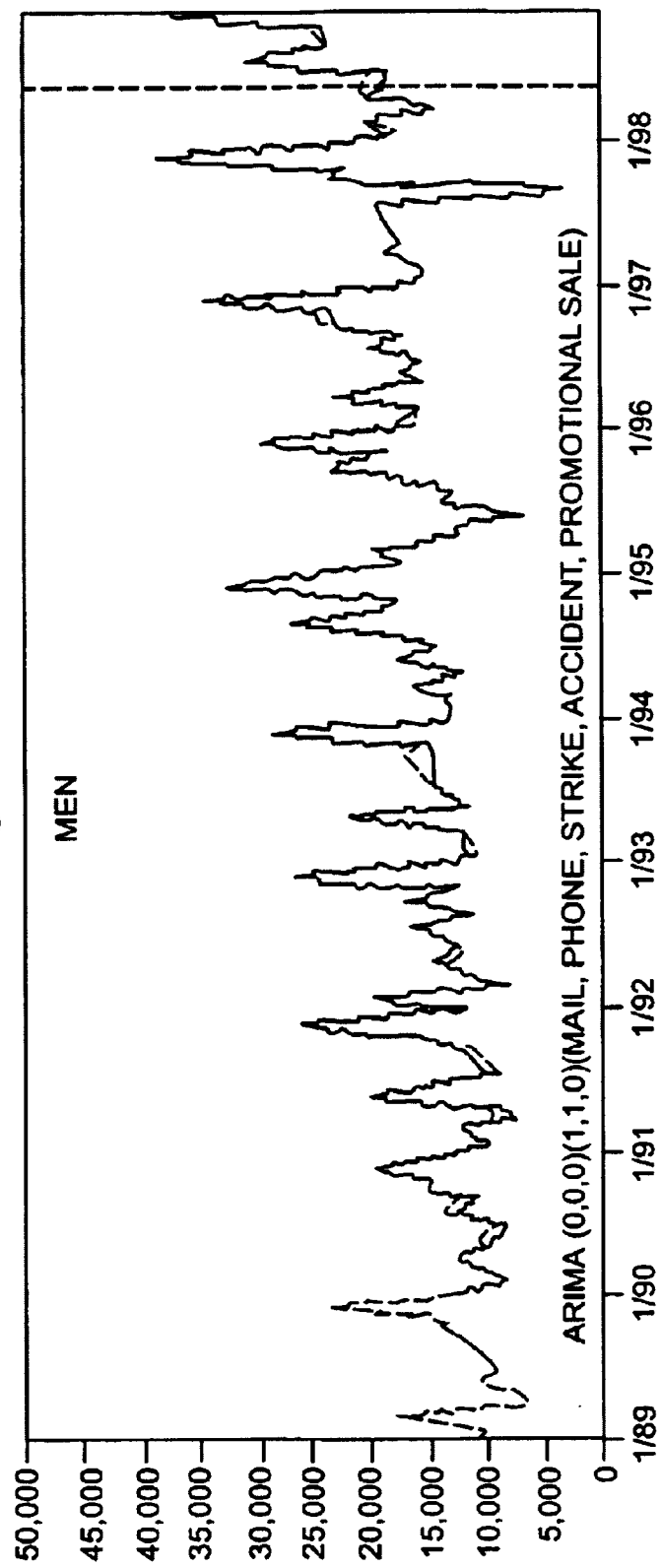

SYSTEM AND METHOD FOR BUILDING A TIME SERIES MODEL

FIELD OF THE INVENTION

The invention relates to methods and computer systems for assigning a model to a time series.

BACKGROUND OF THE INVENTION

The ability to accurately model and predict events is very desirable, especially in today's business environment. Accurate modeling would help one to predict future events, resulting in better decision making in order to attain improved performance. Because reliable information concerning future trends is so valuable, many organizations spend a considerable amount of human and monetary resources attempting to forecast future trends and analyze the effects those trends may ultimately produce. One fundamental goal of forecasting is to reduce risk and uncertainty. Business decisions depend upon forecasting. Thus forecasting is an essential tool in many planning processes.

Two classes of models are utilized to create forecasting models, exponential smoothing models and autoregressive integrated moving average (ARIMA) models. Exponential smoothing models describe the behavior of a series of values over time without attempting to understand why the values behave as they do. There are several different exponential smoothing models known in the art. Conversely, ARIMA statistical models allow the modeler to specify the role that past values in a time series have in predicting future values of the time series. ARIMA models also allow the modeler to include predictors which may help to explain the behavior of the time series being forecasted.

In order to effectively forecast future values in a trend or time series, an appropriate model describing the time series must be created. Creating the model which most accurately reflects past values in a time series is the most difficult aspect of the forecasting process. Eliciting a better model from past data is the key to better forecasting. Previously, the models chosen to reflect values in a time series were relatively simple and straightforward or the result of long hours and tedious mathematical analysis performed substantially entirely by the person creating the model. Thus, either the model was relatively simplistic and very often a poor indicator of future values in the time series, or extremely labor intensive and expensive with perhaps no better chance of success over a more simplistic model. Recently, the availability of improved electronic computer hardware has allowed much of the modeling aspects of forecasting to be done rapidly by computer. However, prior computer software solutions for forecasting were restricted because the number of models against which historical data were evaluated was limited and typically low ordered, although potentially there is an infinite number of models against which a time series may be compared.

Modeling is further complicated because finding the best model to fit a data series requires an iterative data analysis process. Statistical models are designed, tested and evaluated for their validity, accuracy and reliability. Based upon the conclusions reached from such evaluations, models are continually updated to reflect the results of the evaluation process. Previously, this iteration process was cumbersome, laborious, and generally ineffective due to the inherent limitations of the individuals constructing the models and the lack of flexibility of computer-based software solutions.

The model building procedure usually involves iterative cycles consisting of three stages: (1) model identification, (2) model estimation, and (3) diagnostic checking. Model identification is typically the most difficult aspect of the model building procedure. This stage involves identifying differencing orders, the autoregression (AR) order, and the moving average (MA) order. Differencing orders are usually identified before the AR and MA orders. A widely used empirical method for deciding differencing is to use an autocorrelation function (ACF) plot in a way such that the failure of the ACF to die out quickly indicates the need for differencing. Formal test methods exist for deciding the need for differencing, the most widely used of such methods being the Dickey-Fuller test, for example. None of the formal test methods, however, works well when multiple and seasonal differencings are needed. The method used in this invention is a regression approach based upon Tiao and Tsay (1983). The Dickey-Fuller test is a special case of this approach.

After the series is properly differenced, the next task is to find the AR and MA orders. There are two types of methods in univariate ARIMA model identification: pattern identification methods and penalty function methods. Among various pattern identification methods, patterns of ACF and partial autocorrelation function (PACF) are widely used. PACF is used to identify the AR order for a pure AR model, and ACF is used to identify the MA order for a pure MA model. For ARIMA models where both the, AR and MA components occur, ACF and PACF identification methods fail because there are no clearcut patterns in ACF and PACF. Other pattern identification methods include the R and S array method (Gary et al., 1980), the corner method (Begun et al., 1980), the smallest canonical correlation method (Tsay and Tiao, 1985), and the extended autocorrelation function (EACF) method (Tsay and Tiao, 1984). These methods are proposed to concurrently identify the AR and MA orders for ARIMA models. Of the pattern identification methods, EACF is the most effective and easy-to-use method.

The penalty function methods are estimation-type identification procedures. They are used to choose the orders for ARMA(p,q)(P,Q) model to minimize a penalty function $P(i,j,k,l)$ among $0 \leq i \leq I$, $0 \leq j \leq J$, $0 \leq k \leq K$, $0 \leq l \leq L$. There are a variety of penalty functions, including, for example, the most popularly used, AIC (Akaike's information criterion) and BIC (Bayesian information criterion). The penalty function method involves fitting all possible $(I+1)(J+1)(K+1)(L+1)$ models, calculating penalty function for each model, and picking the one with the smallest penalty function value. Values I, J, K and L that are chosen must be sufficiently large to cover the true p, q, P and Q. Even the necessary I=J=3 and K=L=2 produce 144 possible models to fit. This could be a very time consuming procedure, and there is a chance that I, J, K, L values are too low for the true model orders to be covered.

Although identification methods are computationally faster than penalty function methods, pattern identification methods cannot identify seasonal AR and MA orders well. The method in this invention takes the pattern identification approach for identifying non-seasonal AR and MA orders by using ACF, PACF and EACF patterns. The seasonal AR and MA orders are initialized as P=Q=1 and are left to the model estimation and diagnostic checking stage to modify them.

Thus, there is a need for a system and method for accurately fitting a statistical model to a data series with minimal input from an individual user. There is a further need for a more flexible and complex model builder which allows an individual user to create a better model and which can be used to improve a prior model. There is also a need for a system and method for performing sensitivity analyses on the created models.

SUMMARY OF THE INVENTION

In accordance with one aspect of the present invention, a computer system and method for building a statistical model based on both univariate and multivariate time series is provided.

The system and method of the invention allow modeling and prediction based upon past values (univariate modeling) or a combination of past values viewed in conjunction with other time series (multivariate modeling), through increasingly complex ARIMA statistical modeling techniques.

Throughout this application, Y(t) represents the time series to be forecasted.

Univariate ARIMA models can be mathematically represented in the form $$\phi(B)\Phi(B^s)(1-B)^d(1-B^s)^D Y(t) = \mu + \Theta(B)\Theta(B^s)a(t)$$

wherein:
autoregressive (AR) polynomials are
non-seasonal $\phi(B)=(1-\phi_1 B- \ldots -\phi_p B^p)$,
seasonal $\Psi(B^s)=(1\Phi_1 B^s- \ldots -\Phi_P B^{Ps})$,
moving-average (MA) polynomials are
non-seasonal $\theta(B)=(1-\theta_1 B- \ldots -\theta_q B^q)$,
seasonal $\Theta(B^s)=(1-\Theta_1 B^s- \ldots -\Theta_Q B^{Qs})$,
a(t) is a white noise series,
s is the seasonal length, and
B is the backshift operator such that BY(t)=Y(t−1).

The d and D are the non-seasonal and seasonal differencing orders, p and P are non-seasonal and seasonal AR orders, and q and Q are non-seasonal and seasonal MA orders.

This model is denoted as "ARIMA (p, d, q) (P, D, Q)." Sometimes it is f(Y(t)), the suitable transformation of Y(t), following the ARIMA (p, d, q) (P, D, Q), not Y(t) itself. The transformation function f(.) can be a natural logarithmic or square root in the invention. The transformation function f(.) is also called the "variance stabilizing" transformation and the differencing the "level stabilizing" transformation. If Y(t) follows a ARIMA(p,d,q)(P,D,Q) model, then after differencing Y(t)d times non-seasonally and D times seasonally, it becomes a stationary model denoted as ARMA (p,q)(P,Q). Some short notations are commonly used for special situations, for example, ARIMA(p,d,q) for non-seasonal models, AR(p)(P) for seasonal AR models and AR(p) for non-seasonal AR models.

At the model identification stage, first stage of the model building procedure, one chooses the proper transformation function f, differencing orders d and D, AR orders p and P, MA orders q and Q. At the model estimation stage, the identified model is fit to the data series to get the estimates for parameters $\mu$, $\{\phi_i\}_{i=1}^P$, $\{\Phi_i\}_{i=1}^P$, $\{\theta_i\}_{i=1}^q$, $\{\Theta_i\}_{i=1}^Q$. The estimation results may suggest that some parameters are zero and should be eliminated from the model. At the diagnostic checking stage, it is determined whether or not the chosen model fits the data and when the chosen model does not fit the data, suggests how to modify the model to start the next iterative cycle. The ARIMA models and the three-stage model building procedure became popular following the 1976 publication of the book "Time Series Analysis, Forecasting and Control" by Box and Jenkins.

Multivariate models are appropriate when other series $(X_1(t), X_2(t), \ldots, XK(t))$ influence the time series to be forecasted Y(t). The multivariate ARIMA models considered in this invention are actually the transfer function models in "Time Series Analysis, Forecasting and Control" by Box and Jenkins (1976). Such models can be mathematically represented as follows:

$$(1-B)^d(1-B^s)^D Y(t) = \mu + \sum_{i=1}^{K} v_i(B)(1-B)^{d_1}(1-B^s)^{D_i} X_i(t) + N(t),$$

where $v_i(B)(1-B)^d(1-B^s)^{D_i}$ is the transfer function for $X_i(t)$. The v(B) takes form $$v(B) = \frac{\omega_0 + \omega_1 B + \cdots \omega_h B^h}{1 - \delta_1 B - \cdots - \delta_r B^r} B^b,$$

where b is called the lag of delay, h the numerator polynomial order, and r the denominator order.

N(t) is the disturbance series following a zero mean univariate ARMA (p, q) (P, Q) model. As in the univariate situation, one can replace Y(t) and $X_i(t)$ by their respective properly transformed form, f(Y(t)) and $f_i(X_i(t))$. Identifying a multivariate ARIMA model involves finding the differencing orders d, D, proper transformation f(.) for Y(t), $f_i(.)$, and the transfer function, including finding the lag of delay, the numerator and denominator orders for each $X_i(t)$, and the ARMA orders for disturbance series N(t). The three-stage model building iterative cycles apply here, except that the identification stage and estimation stage interact with each other more heavily.

For multivariate ARIMA models, Box and Jenkins (1976) proposed a model building procedure that involves a prewhitening technique. Their method works only if, there is one predictor: where there are more than one predictor, the pre-whitening technique is not applicable. The linear transfer function (LTF) method is proposed by Liu and Hanssens (1982) in this case. The LTF method is summarized as follows:

1. Fit a model with form, $$Y(t) = \mu + \sum_i (\omega_{i0} + \omega_{i1} B + \cdots \omega_{im} B^m) X_i(t) + N(t),$$

for a "sufficiently" large value m and with initial N(t) following model AR(1) for s=1 and AR(1)(1) for s>1.
2. Check if the estimated disturbance series N(t) is stationary. If not, difference both the Y and X series. Fit the same model for the properly differenced series.
3. Specify a tentative rational transfer function using the estimated coefficients for each predictor series, and specify a tentative ARIMA model for N(t).
4. Fit the model, and check for adequacy. If not adequate, go back to step 3.

Aside from some detailed differences, the method of this invention is different from the LTF method in two significant respects: first, some predictor series are eliminated before the initial model. This makes the later model estimation easier and more accurate. Second, the AR and MA orders found for Y(t) through the univariate ARIMA procedure is used for N(t) in the initial model. This avoids the model identification for N(t) and makes the parameter estimates more accurate.

In accordance with the invention, a method for determining the order of a univariate ARIMA model of a time series utilizing a computer is provided. The method includes inputting the time series comprised of separate data values into the computer, inputting seasonal cycle length for the time series into the computer and determining whether the time series has any missing data values. If any data values are missing, at least one and, preferably, all embedded missing values are imputed into the time series.

For a time series, the first value and the last value are presumed not missing. If users have a series with the first and/or the last value missing, the series is shortened by deleting initial and end missings. Shortening a series is not part of an expert modeler system: it is done in Decision-Time™ when the data series is first inputted. This is a common practice. In an expert system, the series received is the shortened series and all missing values there are imputed.

A determination is made whether the separate data values and any imputed data values of the time series are positive numbers. A time series composed of positive values is transformed if necessary. Differencing orders for the time series are then determined. An initial ARIMA model is constructed for the time series and thereafter, if necessary, the initial ARIMA model is modified based on iterative model estimation results, diagnostic checking, and ACF/PACF of residuals to produce a revised ARIMA model.

In accordance with another aspect of the invention, a method for determining the order of a multivariate ARIMA model of a time series utilizing a computer is provided. The method includes inputting the time series into the computer, inputting the seasonal length for the time series into the computer and inputting at least one category consisting of predictors, interventions and events represented by numerical values into the computer. The univariate ARIMA order for the time series is determined by the method described above, and it is determined whether the input of the categories has one or more missing values. The inputted categories having one or more missing values is discarded. The inputted categories are transformed and differenced typically by using the same transformation and differencing orders applied to the time series to be forecasted. Some inputted predictors may be further differenced or eliminated, based on the cross correlation function (CCF). An initial ARIMA model is constructed for the time series based on the univariate ARIMA found for the time series, the intervention and events, and the remaining predictors. Thereafter, the initial ARIMA model is modified based on the iterative model estimation results, diagnostic checking, and ACF/PACF of residuals.

In accordance with other aspects of the invention, a computer system and non-volatile storage medium containing computer software useful for performing the previously described method is also provided.

BRIEF DESCRIPTION OF THE DRAWINGS

FIG. 5 is a graph illustrating one embodiment of the invention.

DETAILED DESCRIPTION OF THE PREFERRED EMBODIMENTS

Figure 1:
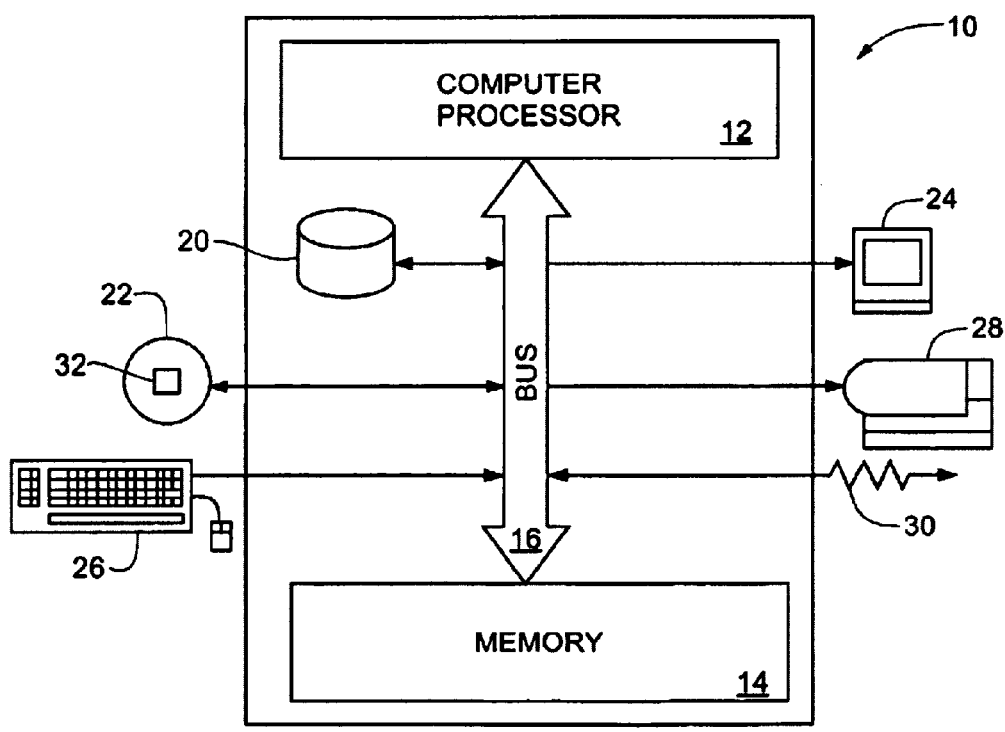
FIG. 1 is a block diagram illustrating a data processing system in accordance with the invention.

Referring to the figures generally, and in particular to FIG. 1, there is disclosed a block diagram illustrating a data processing system 10 in accordance with the invention. Data processing system 10 has a computer processor 12 and a memory 14 connected by a bus 16. Memory 14 is a relatively high-speed machine readable medium and includes volatile memories such as DRAM, SRAM and non-volatile memories such as ROM, FLASH, EPROM, EEPROM and bubble memory, for example. Also connected to bus 16 are secondary storage medium 20, external storage medium 22, output devices such as a computer monitor 24, input devices such as a keyboard (with mouse) 26 and printers 28. Secondary storage medium 20 includes machine readable media such as hard disk drives, magnetic drum and bubble memory, for example. External storage medium 22 includes machine readable media such as floppy disks, removable hard drives, magnetic tape, CD-ROM, and even other computers, possibly connected via a communications line 30. The distinction drawn between secondary storage medium 20 and external storage medium 22 is primarily for convenience in describing the invention. It should be appreciated that there is substantial functional overlap between these elements. Computer software in accordance with the invention and user programs can be stored in a software storage medium, such as memory 14, secondary storage medium 20 and external storage medium 22. Executable versions of computer software 32 can be read from a non-volatile storage medium such as external storage medium 22, secondary storage medium 20 or non-volatile memory, and then loaded for execution directly into the volatile memory, executed directly out of non-volatile memory or stored on secondary storage medium 20 prior to loading into volatile memory for execution, for example.

Figure 2:
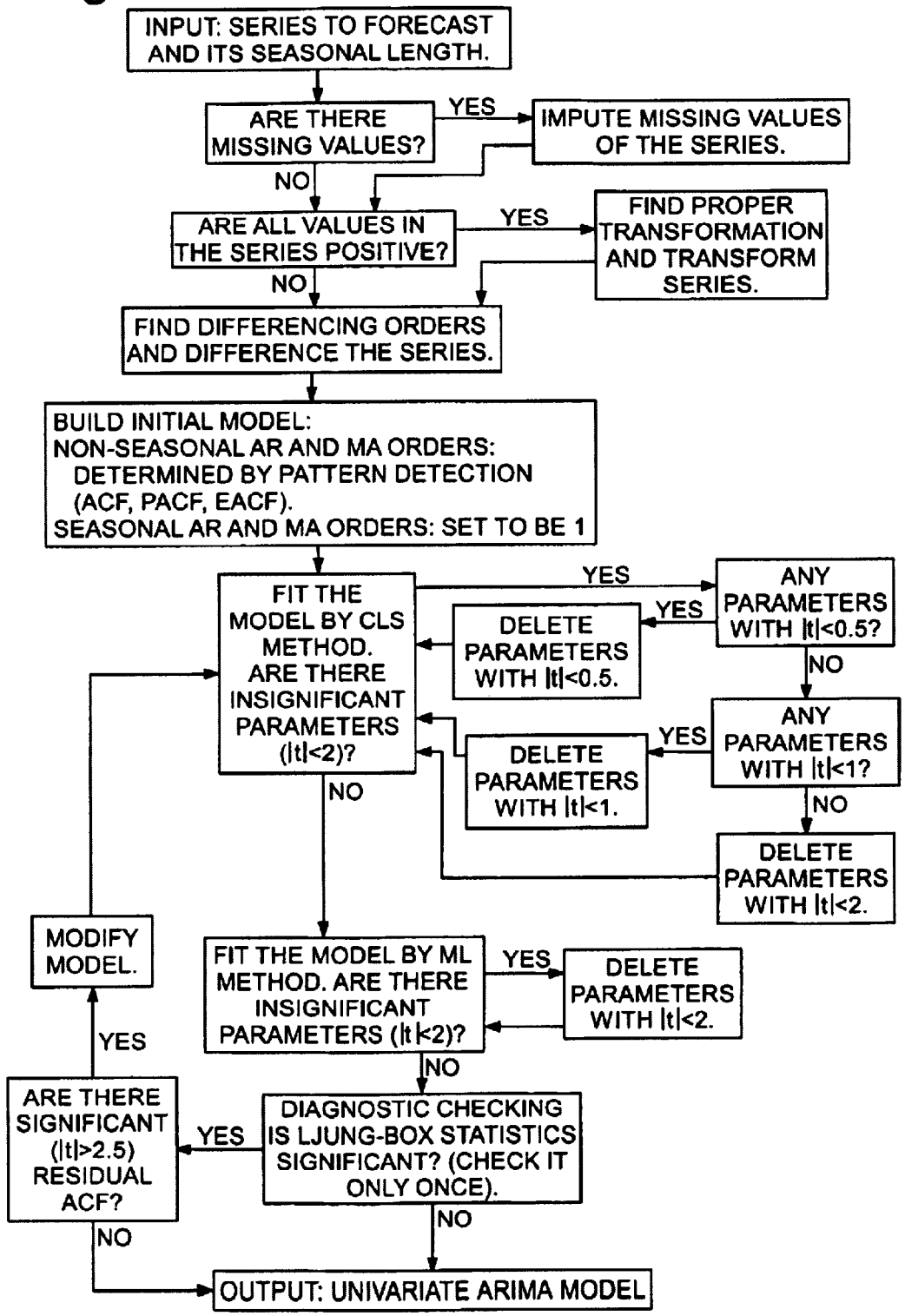
FIG. 2 is a flow diagram illustrating univariate ARIMA modeling in accordance with the present invention.

Referring to FIG. 2, a flow diagram is provided illustrating the algorithm used by the computer to create a univariate ARIMA model from a time series of individual data elements. The univariate modeling algorithm involves the following basic steps:

1. Finding the proper transformation and transforming the time series;
2. Determining the differencing (I) orders for the time series, both seasonal and non-seasonal;
3. Determining the seasonal and non-seasonal autoregressive (AR) orders for the time series; and
4. Determining the moving-average (MA) seasonal and non-seasonal orders for the time series.

Preferably, the ARIMA model is constructed in the order described below, however those skilled in the art will recognize that the statistical modeling sequence need not occur in the exact order described in the embodiment discussed below.

Before an ARIMA statistical model can be created for a time series, the time series Y(t) and its seasonal length or period of seasonality s are input into the computer program utilizing the algorithm. Next, the time series is examined to determine if the inputted time series has any missing values. If the time series has any missing values, those non-present values are then imputed into the time series as follows:

A. Impute Missing Values

Missing values can be imputed in accordance with linear interpolation using the nearest neighbors or seasonal neighbors, depending on whether the series has a seasonal pattern. Missing values are imputed as follows:

Determine if there is seasonal pattern.

If s=1, no seasonal pattern.

If s>1, calculate sample ACF of the series. ACF of lag k for time series Y(t) is calculated as $$ACF(k) = \frac{\sum_{t=1}^{n-k}(Y(t)-\overline{Y})(Y(t+k)-\overline{Y})}{\sum_{j=1}^{n}(Y(t)-\overline{Y})^2},$$

where n is the length of the series and Y is the mean of the series.

If the ACF have absolute t-values greater than 1.6 for all the first six lags, take a non-seasonal difference of the series and calculate the ACF of the differenced series. Let $m_1$=max (ACF(1) to ACF(k)), where k=s−1 for s≦4, k=s−2 for 4<s≦9, and k=8 for s≧10. Let $m_2$=max (ACF(s), ACF(2s)). If $m_1$>$m_2$, then it is assumed there is no significant seasonal pattern, otherwise there is a seasonal pattern.

The presence or absence of a seasonal pattern is taken into account as follows:

Without a seasonal pattern—missing values are linearly interpolated using the nearest non-missing neighbors; and With a seasonal pattern—missing values are linearly interpolated using the nearest non-missing data of the same season.

If there are missing values, they are imputed in this step. Hence, one can assume that there is no missing value in the time series from now on. If the time series contains only positive values, the time series may be transformed according to the following:

B. Find Proper Transformation

The proper transformation is preferably found in accordance with the following steps. For positive series Y, fit a high order AR(p) model by the ordinary least squares method (OLS) on Y, log (Y) and square root of Y. Compare the log likelihood function of Y for each model. Let $I_{max}$ denote the largest log likelihood of the three models, and $I_y$ the log likelihood of the model for Y itself. If $I_{max} \neq I_y$, and both $(1/n)(I_{max}-I_y)$ and $|(I_{max}-I_y)I_y|$ are larger than 4%, the transformation that corresponds to $I_{max}$ is done Otherwise, no transformation is needed.

The rules for choosing order p are as follows: for s≦3, consider AR(10); for 4≦s≦11, consider AR(14); for s≧12, consider a high order AR model with lags 1 to 6, s to s+3, 2s to 2s+2 (if sample size is less than 50, drop lags≧2s).

The differencing order of the time series is also calculated. Determination of the differencing order is divided into two steps, (a) and (b). Step(a) makes a preliminary attempt to determine the differencing order; step(b) further differences the time series.

C. Find Differencing Orders

The differencing orders are preferably found in accordance with the following procedure.

Step (a)

Where s=1:

Fit model $Y(t)=c+\phi_1 Y(t-1)+\phi_2 Y(t-2)+a(t)$ by the ordinary least squares method. Check $\phi_1$ and $\phi_2$ against the critical values defined in Table 1. If $\{\phi_1>C(1,1)$ and $-\phi_2>C(1,2)\}$, then take the difference $(1-B)^2 Y(t)$. Otherwise, fit model $Y(t)=c+\phi Y(t-1)+a(t)$. If $\{|t(c)|<2$ and $\phi>C(2,1)\}$ or $\{|t(c)|\geq 2$ and $(\phi-1)/se(\phi)>C(3,1)\}$, then take the difference $(1-B)Y(t)$. Otherwise no difference.

Where s>1:

Fit model $Y(t)=c+\phi_1 Y(t-1)\phi_2 Y(t-s)+\phi_3 Y(t-s-1)+a(t)$ by the ordinary least squares method. The critical values C(i,j) are defined in Table 2. If $\{\phi_1>C(1,1)$ and $\phi_2>C(1,2)$ and $-\phi_3>C(1,1)\ C(1,2)\}$, take the difference $(1-B)(1-B^s)Y(t)$.

Otherwise if $\phi_1 \leq \phi_2$, fit model $Y(t)=c+\phi Y(t-s)+a(t)$. If $\{|t(c)|<2$ and $\phi>C(2,1)\}$ or $\{|t(c)|>2$ and $(\phi-1)/se(\phi)>C(3,1)\}$, then take the difference $(1-B^s)Y(t)$.

Otherwise if $\phi_1>\phi_2$, fit model $Y(t)=c+\phi Y(t-1)+a(t)$. If $\{|t(c)|<2$ and $\phi>C(4,1)\}$ or $\{|t(c)|\geq 2$ and $(\phi-1)\ se(\phi)>C(5,1)\}$, take the difference $(1-B)Y(t)$. Otherwise no difference.

Step(b)

For data after step (a), the data are now designated as "Z(t)".

Where s=1:

Fit an ARMA (1,1) model $(1-\phi B)\ Z(t)=c+(1-\theta B)\ a(t)$ by the conditional least squares (CLS) method. If $\phi>0.88$ and $|\phi-\theta|>0.12$, take the difference (1−B) Z(t). If $\phi<0.88$ but is not too far away from 0.88—e.g., if $0.88-\phi<0.03$—then ACF of Z should be checked. If the ACF have absolute t-values greater than 1.6 for all the first six lags, take the difference (1−B) Z(t).

Where s>1 and the number of non-missing Z is less than 3s, do the same as in the case where s=1.

Where s>1 and the number of non-missing Z is greater than or equal to 3s:

Fit an ARMA (1,1)(1,1) model $(1-\phi_1 B)(1-\phi_2 B^s)\ Z(t)=c+(1-\theta_1 B)(1-\theta_2 B^s)\ a(t)$ by, the CLS method.

If both $\phi_1$ and $\phi_2>0.88$, and $|\phi_1-\theta_1|>0.12$ and $|\phi_2-\theta_2|>0.12$, take the difference $(1-B)(1-B^s)Z(t)$. If only $\phi_1>0.88$, and $|\phi_1-\theta_1|>0.12$, take the difference (1−B)Z(t). If $\phi_1<0.88$ but is not too far away from 0.88—e.g., 0.88−$\phi_1<0.03$—then ACF of Z should be checked. If the ACF have absolute t-values greater than 1.6 for all the first six lags, take the difference (1−B) Z(t).

If only $\phi_2>0.88$, and $|\phi_2-\theta_2|>0.12$, take the difference $(1-B^s)Z(t)$.

Repeat step (b), until no difference is needed.

To find the correct differencing order is an active research field. A widely used empirical method involves using the ACF plot to find out whether a series needs to be differenced or not. Under such method, if ACFs of the series are significant and decreasing slowly, difference the series. If ACFs of the differenced series are still significant and decreasing slowly, difference the series again, and do so as many times as needed. This method is, however, difficult to use for finding seasonal differencing because it requires calculating ACF at too many lags.

There is an increasing interest in more formal tests due to their theoretical justifications. Examples of formal tests are the augmented Dickey-Fuller test (1979), the Dickey, Hasza and Fuller test (1984), the Phillips-Perron test (1988), and the Dickey and Pantula test (1987). None of these tests, however, is capable of handling multiple differencing and seasonal differencing.

The method used in step (a) is based on Tiao and Tsay (1983), who proved that for the ARIMA(p,d,q) model, the ordinary least squares estimates of an AR(k) regression, where k≧d, are consistent for the nonstationary AR coefficients. In light of the finite sample variation, step (a) starts with checking for multiple differencings and working down to a single differencing. This step should catch the most commonly occurring differencings: $(1-B)^2$ and (1−B) for a non-seasonal series; and $(1-B)(1-B^s)$, $(1-B^s)$ and (1−B) for a seasonal series.

Step (b) is a backup step, should step (a) miss all the necessary differencings.

Critical values used in step (a) are determined as shown in Table 1 for s=1 and in Table 2 for s>1.

TABLE 1

Definition of critical values C(i,j) for s = 1

| | |
|---|---|
| C(1,1) and C(1,2) | Critical values for $\phi_i$ and $-\phi_2$ in fitting the model $Y(t) = c + \phi_1 Y(t-1) + \phi_2 Y(t-2) + a(t)$ when the true model is $(1-B)^2 Y(t) = a(t)$. |
| C(2,1) | Critical values for $\phi$ in fitting the model $Y(t) = c + \phi Y(t-1) + a(t)$ when the true model is $(1-B)Y(t) = a(t)$. |
| C(3,1) | Critical value for $(\phi - 1)/se(\phi)$ in fitting the model $Y(t) = c + \phi Y(t-1) + a(t)$ when the true model is $(1-B)Y(t) = c_0 + a(t), c_0 \neq 0$. |

TABLE 2

Definition of critical values C(i,j) for s > 1

| | |
|---|---|
| C(1,1) and C(1,2) and C(1,1)C(1,2) | Critical values for $\phi_1$ and $\phi_2$ and $-\phi_3$ in fitting the model $Y(t) = c + \phi_1 Y(t-1) + \phi_2 Y(t-s) + \phi_3 Y(t-s-1) + a(t)$ when the true model is $(1-B)(1-B^s)Y(t) = a(t)$. |
| C(2,1) | Critical values for $\phi$ in fitting the model $Y(t) = c + \phi Y(t-s) + a(t)$ when the true model is $(1-B^s)Y(t) = a(t)$. |
| C(3,1) | Critical values for $(\phi - 1)/se(\phi)$ in fitting the model $Y(t) = c + \phi Y(t-s) + a(t)$ when the true model is $(1-B^s)Y(t) = c_0 + a(t), c_0 \neq 0$. |
| C(4,1) | Critical values for $\phi$ in fitting the model $Y(t) = c + \phi Y(t-1) + a(t)$ when the true model is $(1-B)Y(t) = a(t)$. |
| C(5,1) | Critical values for $(\phi - 1)/se(\phi)$ in fitting the model $Y(t) = c + \phi Y(t-1) + a(t)$ when the true model is $(1-B)Y(t) = c_0 + a(t), c_0 \neq 0$. |

Note the following:

1. Critical values depend on sample size n.

Let t(0.05, df) be the 5% percentile of a t-distribution with degree of freedom df. Then C(3,1)=t(0.05, n−3) in Table 1; and C(3,1)=t(0.05,n−s−2) and C(5,1)=t(0.05, n−3) in Table 2.

For other critical values, critical values for n=50, 100, 200, 300 are simulated. Since critical values approximately depend on 1/n linearly, this approximate relationship is used to get a better critical value for an arbitrary n.

2. Critical values also depend on seasonal length s.

Only critical values for s=1, 4,12 are simulated. For s>1 and where s is different from 4 and 12, use the critical values of s=4 or s=12, depending on which one is closer to s.

D. Initial Model: Non-Seasonal AR Order p and MA Order Q

In this step, tentative orders for the non-seasonal AR and MA polynomials, p and q, are determined. If seasonality is present in the time series, the orders of the seasonal AR and MA polynomials are taken to be 1.

Use ACF, PACF, and EACF to identify p and q as follows, where M and K, $K \leq M$ are integers whose values depend on seasonal length.

ACF:

For the first M ACF, let $k_1$ be the smallest number such that all ACF($k_1$+1) to ACF(M) are insignificant (i.e., |t| statistic<2). If $k_1 \leq K$, then p=0 and q=$k_1$. The method of using ACF may not identify a model at all.

PACF:

For the first M PACF, let $k_2$ be the smallest number such that all PACF($k_2$+1) to PACF(M) are insignificant (i.e., |t| statistic<2). If $k_2<K$, then p $k_2$ and q=0. The method of using PACF may not identify a model at all.

EACF:

For an M by M EACF array, the following procedure is used:

i. Examine the first row, find the maximum order where the maximum order of a row means that all EACF in that row above that order are insignificant. Denote the model as ARMA(O,$q_0$).

ii. Examine the second row, find the maximum order. Denote the model as ARMA(1,$q_1$). Do so for each row, and denote the model for the ith row as ARMA(i−1, $q_{i-1}$).

iii. Identify p and q as the model that has the smallest p+q. If the smallest p+q is achieved by several models, choose the one with the smaller q because AR parameters are easier to fit.

Among the models identified by ACF, PACF, and EACF, choose the one having the smallest p+q. If no single model has the smallest p+q, proceed as follows: if the tie involves the model identified by EACF, choose that model. If the tie is a two-way tie between models identified by ACF and PACF, choose the model identified by PACF.

E. Modify Model

After the ARIMA model is constructed, the model is preferably modified by treating the model with at least three phases of modification. The flow diagram shown in FIG. 2 illustrates the phase involved in model modification.

The model is first modified by deleting the insignificant parameters based on the conditional least squares (CLS) fitting results. This is done in iterative steps according to a parameter's t-values.

The model is next modified by deleting the insignificant parameters based on the maximum likelihood (ML) fitting results. (The ML method is more accurate but slower than the CLS method.)

The last phase of model modification involves performing a diagnostic check and if the model does not pass the diagnostic check, adding proper terms to the model.

In diagnostic checking, Ljung-Box statistics is used to perform a lack of fit test. Suppose that we have the first K lags of residual ACF $r_l$ to $r_k$. Then, the Ljung-Box statistics Q(K) is defined as $$Q(K) = n(n+2) \sum_{k=1}^{K} r_k^2 / (n-k),$$

where n is the number of non-missing residuals. Q(K) has an approximate Chi-squared distribution with degree of freedom K−m, where m is the number of parameters other than the constant term in the model. Significant Q(K) indicates a model inadequacy. To determine whether Q(K) is significant or not, the critical value at level 0.05 from Chi-squared distribution is used. If Q(K) is significant, the individual residual ACF(1) to ACF(M) are checked. If there are large enough ACFs (|t|>2.5), the model is thus modified as follows. (The value K and M could be chosen as any reasonable positive integers and preferably depend on seasonal length. In this invention, we chose K=18 for s=i, K=2−s for s>1, and M=K for s=1, M=s−1 for 1<s<15, M=14 for s>15.)

For the non-seasonal part, if the residual ACF(1) to ACF(M) have one or more significant lags (t>2.5), add these lags to the non-seasonal MA part of the model. Otherwise, if the residual PACF(1) to PACF(M) have one or two significant lags (|t|>1>2.5), add these lags to the non-seasonal AR part of the model.

For the seasonal part, if none of ACF(s) and ACF(2s), or none of the PACF(s) and PACF(2s), is significant, then no modification is needed.

Otherwise, if the PACF(s) is significant and the PACF(2s) is insignificant, add the seasonal AR lag 1. Otherwise, if the ACF(s) is significant and the ACF(2s) is insignificant, add the seasonal MA lag 1. Otherwise, if the PACF(s) is insignificant and the PACF(2s) is significant, add the seasonal AR lag 2. Otherwise, if the ACF(s) is insignificant and the ACF(2s) is significant, add the seasonal MA lag 2. Otherwise, add the seasonal AR lags 1 and 2.

Other than ARIMA models, there are other types of models; for example, exponential smoothing models. The present invention is a method of finding the "best" univariate ARIMA model. If one does not know which type of model to use, one may try to find the "best" of each type and then compare those models to find the "best" overall model. The difficulty in comparing models of different types, however, is that some models may have transformation and/or differencing and some may not. In such instances, the commonly used criteria such as Bayesian information criterion (BIC) and Akaike information criterion (AIC) are inappropriate. This invention utilizes the normalized Bayesian information criterion (NBIC) which is appropriate for comparing models of different transformations and different differencing orders. The NBIC is defined as $$NBIC = \ln(MSE) + k\frac{\ln(m)}{m},$$

where k is the number of parameters in the model, m is the number of non-missing residuals, and MSE is the mean squared error defined as $$MSE = \frac{1}{m-k}\sum_t (\hat{e}(t))^2,$$

where sum is over all the non-missing residuals $\hat{e}(t)=Y(t)-\hat{Y}(t)$, $Y(t)$ is the original non-transformed and non-differenced series, and $\hat{Y}(t)$ is the one-step ahead prediction value. As used herein, the MSE in NBIC is the MSE for the original series, not for transformed or differenced data. When the series is differenced, it gets shorter than the original series, hence normalization is needed. So by using the MSE of the original series and dividing by the effective series length, models of different transformation and differencing orders are comparable. The maximized likelihood function of the original series may be used to replace MSE in NBIC definition and may be more accurate in some circumstances. However, calculation of MSE is much easier and it works fine in our experience.

Figure 3:
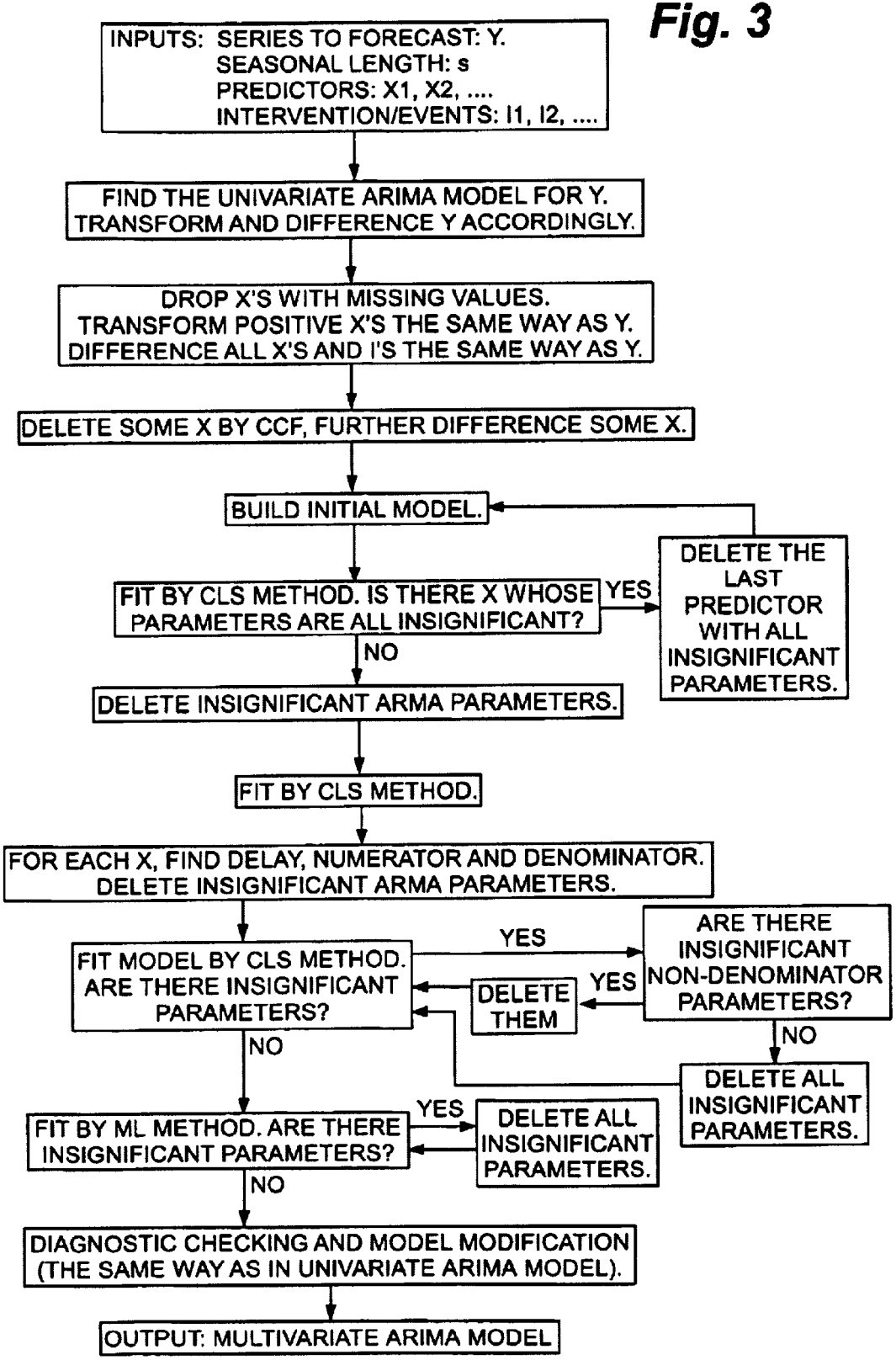
FIG. 3 is a flow diagram illustrating multivariate ARIMA modeling in accordance with the invention.

Referring now to FIG. 3, the algorithm utilized by the computer to build a multivariate statistical ARIMA model is shown as a flow diagram which can also be referred to as a transfer-function or distributed-lag model. The multivariate ARIMA model building procedure consists of:

1. finding proper transformation for Y(t) and predictors,
2. finding the ARIMA model for disturbance series, and
3. finding the transfer function for each predictor.

The procedure involves first finding a univariate ARIMA model for Y(t) by the univariate ARIMA model building procedure described in FIG. 2. The transformation found by the univariate procedure is applied to all positive series, including the series to forecast and predictors. The ARIMA orders found by the univariate procedure are used as the initial model for disturbance series. A series of actions are then performed to find the transfer function for each predictor. The details are as follows.

A. Find the univariate ARIMA Model for Y(t)

Use the univariate ARIMA model building procedure to identify a univariate ARIMA model for Y(t). In this step, the following are accomplished.

All missing values of Y(t) are imputed, if there are any.

Transformation of Y(t) is done, if it is needed.

Differencing orders d and D are found, and the corresponding differences of Y(t) are done.

AR and MA orders are found.

In the case where s>1, if there is no seasonal pattern in the univariate ARIMA model found for Y(t), from now on, the case will be treated as if s=1.

If Y(t) is transformed, then apply the same transformation on all positive predictors. If Y(t) is differenced, then apply the same differencing on all predictors, all interventions, and all events.

B. Delete and Difference the Predictors

For each predictor $X_i(t)$, calculate CCF(k) Corr(Y(t), $X_i(t-k)$) for k=0 to 12. If for some $X_i(t)$, none of CCF(0) to CCF(12) is significant ($|t|\geq 2$), find both non-seasonal and seasonal differencing orders for series $X_i(t)$ by the univariate procedure, call them $d_i, D_i$. Compare $d_i$ and $D_i$ with 0, and do the following.

If $d_i=0$ and $D_i=0$, drop $X_i(t)$ from the model.
If $d_i>0$ and $D_i=0$, take difference $(1-B)^{d_i}X_i(t)$.
If $d_i=0$ and $D_i>0$, take difference $(1-B)^{D_i}X_i(t)$.
If $d_i=0$ and $D_i>0$, take difference $(1-B)^{d_i}(1-B)^{D_i}X_i(t)$.
If $X_i(t)$ is differenced after the last calculation of CCF, calculate the CCF(k) again for k=0 to 12. If none of CCF(O) to CCF(12) is significant ($|t|\geq 2$), drop $X_i(t)$ from the model.

Each time $X_i(t)$ is differenced, check if it becomes a constant series. If it becomes constant after differencing, drop it out from the model.

C. Construct Initial Model

For the properly transformed and differenced series Y, Xs and Is, the initial model is:

$$Y(t) = c + \sum_i \left(\sum_{j=0}^m \omega_{ij}B^j\right)X_i(t) + \sum_k \beta_k I_k(t) + N(t)$$

Where $$\sum_i$$

sums over all predictor series, $$\sum_k$$

sums over all intervention and event series, the noise series N(t) is with mean zero and follows an ARMA model that has the exact same AR and MA orders as the univariate ARIMA model found for Y(t). The value m can be chosen as any reasonable integer that is large enough to allow finding lag of delay and seeing patterns, preferably depending on seasonal length. In the invention, the value m is chosen as follows.

For s=1, m=8.

For s>1, m=s+3. (If s+3>20, take m=20.)

When the total number of parameters is greater than half the sample size, decrease the order m so that the total number of parameters is less than half the sample size.

N(t) is termed the disturbance series. A reasonable model for N(t) is needed in order to attain a reliable estimate for parameters in the non-disturbance part. The method of this invention utilizes the univariate ARMA model found for the properly transformed and differenced Y(t) as the initial model for N(t) because the model for Y(t) is believed to cover the model for N(t). As a result, the parameter estimates for ω's are better and can thus be used to reach a more reliable decision. Moreover, the general model for N(t) does not require further model identification for N(t) as do other methods.

D. Find the Lag of Delay, Numerator and Denominator for Each Predictor

This is performed in accordance with the following procedure. For each predictor $X_i(t)$, do the following.

If only one or two $\omega_{ij}$ terms—e.g., $\omega_{ij0}$ and $\omega_{ij1}$—are significant ($|t| \geq 2$), no denominator is needed, the lag of delay is $j_0$ and numerator is $\omega_{ij_0} + \omega_{ij_1} B^{j_1-j_0}$.

If more than two $\omega_{ij0}$, terms are significant, assuming that $\omega_{ij0}$ is the first significant one, the delay lag is $j_0$, the numerator is $\omega_{ij0} + \omega_{i(j0+1)} B + \omega_{i(j0+2)} B^2$ and the denominator is $1 - \delta_{i1} B - \delta_{i2} B^2$.

The methods of this invention are implemented in the commercial software SPSS DecisionTime™ expert modeler. FIGS. 4 to 6A,B are from SPSS DecisionTime™.

EXAMPLE 1

Building a Univariate ARIMA Model for International Airline Passenger Data

Figure 4:
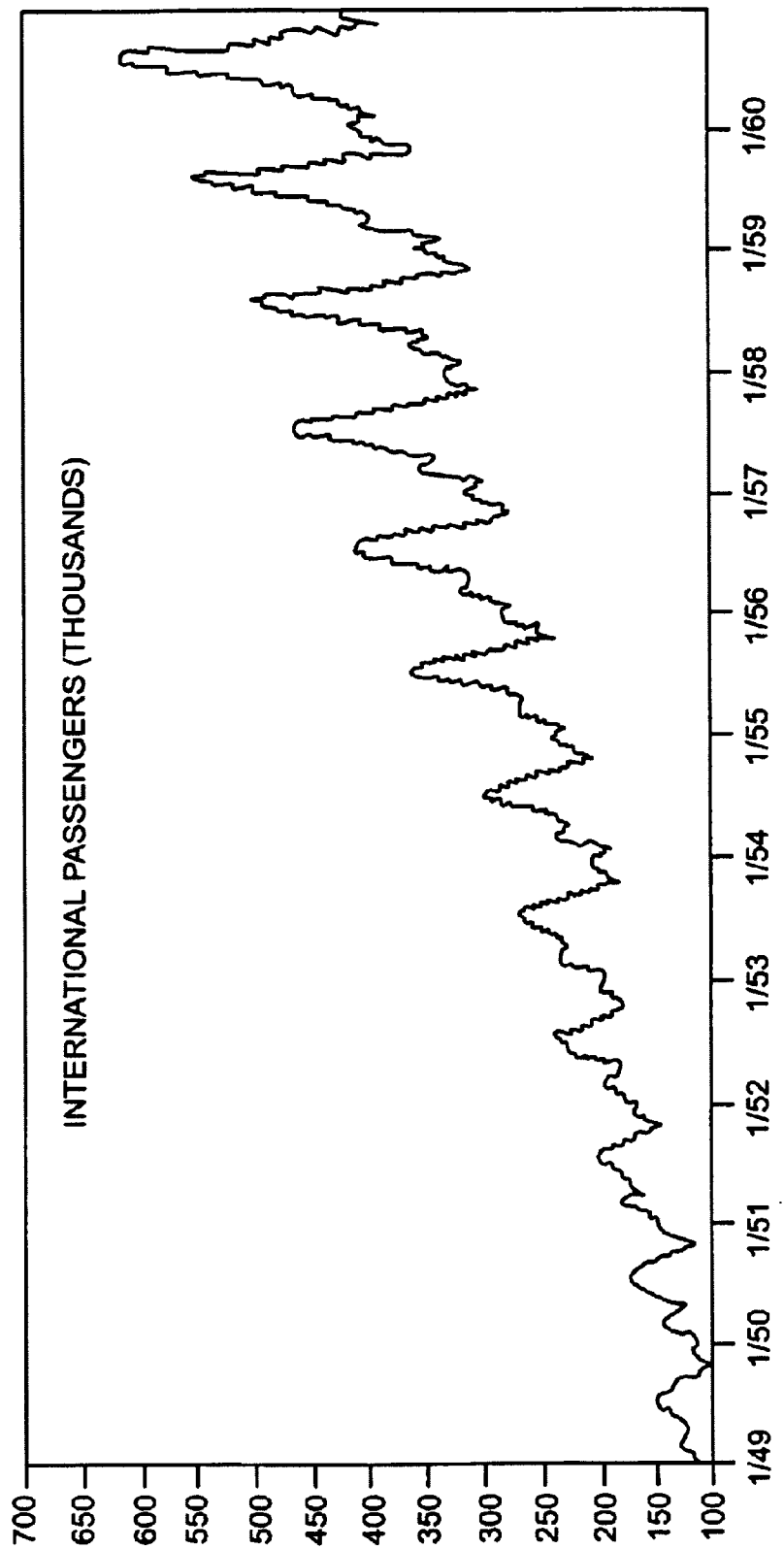
FIG. 4 is a time series graph illustrating one embodiment of the invention.
Figure 6B:
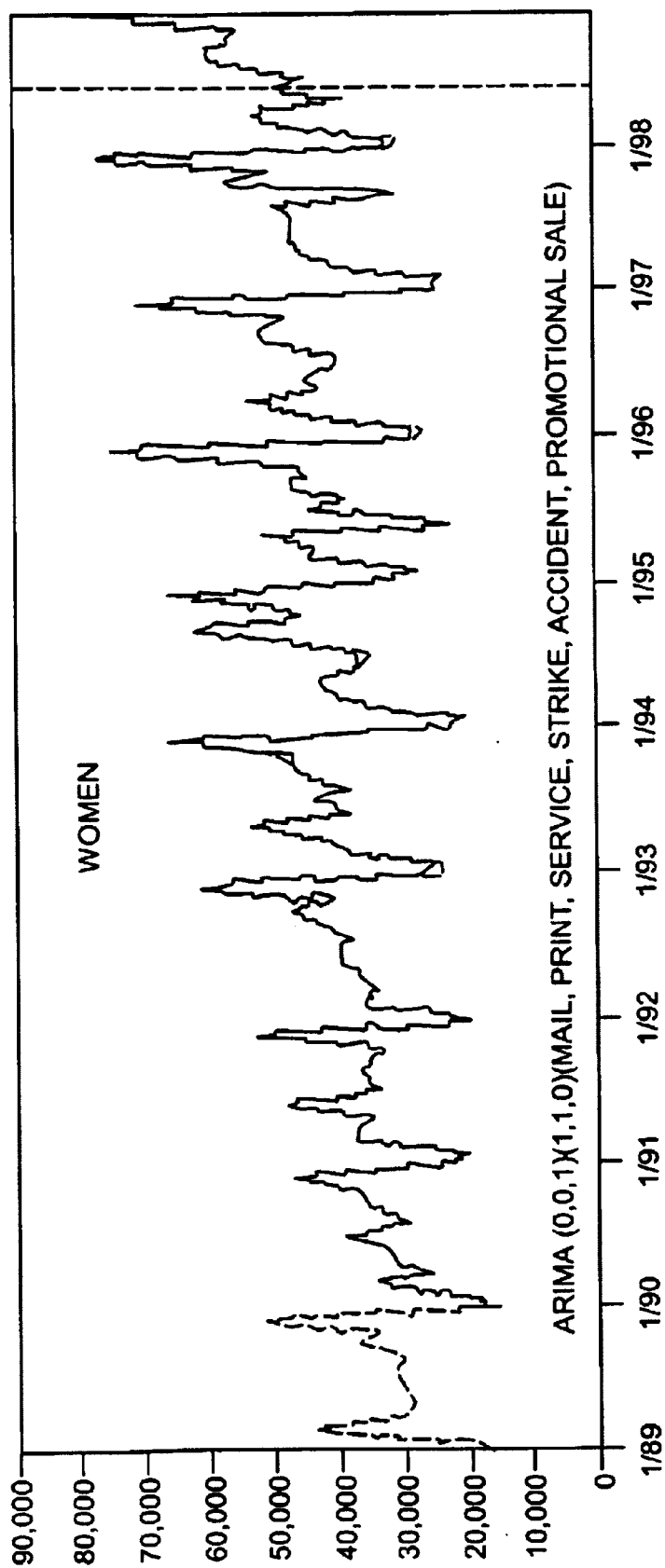
FIGS. 6A,B are graphs illustrating the application of a multivariate ARIMA model in accordance with the invention.

In this example, the series is the monthly total of international airline passengers traveling from January 1949 through December 1960. FIG. 4 shows a graph wherein the y-axis depicts the number of passengers, expressed in thousands, and the x-axis shows the years and months.

Box and Jenkins (1976) studied this series and found that log transformation was needed. They identified the (0,1,1) (0,1,1) model for the log transformed series. As a result, model (0,1,1)(0,1,1) for log transformed series is called the "airline" model. Taking the monthly total of international airline passengers as the input time series to be forecasted and "12" as the input seasonal cycle, the method of this invention finds the same model for such series. FIG. 5 shows the predicted values by the model plotted along with the input time series. The predicted future values are shown for one year after the series ends at December 1960 (12/60). One can see that this model fits the input time series very well.

EXAMPLE 2

Building the Multivariate ARIMA Model for Catalog Sales of Clothing

A multivariate ARIMA model was constructed for predicting catalog sales of men's and women's clothing, as illustrated in FIGS. 6A,B. Comprising simulated, raw data, the data set included the monthly sales of men's clothing and women's clothing by a catalog company from January 1989 through December 1998. Five predictors that may potentially affect the sales included:

(1) the number of catalogs mailed, designated as "mail";

(2) the pages in the catalog, designated as "page";

(3) the number of phone lines open for ordering, designated as "phone";

(4) the amount spent on print advertising, designated as "print"; and (5) the number of customer service representatives, designated as "service."

Other factors considered included the occurrence of a strike ("strike") in June 1995, a printing accident ("accident") in September 1997 and the holding of promotional sales ("promotional sale") in March 1989, June 1991, February 1992, May 1993, September 1994, January 1995, April 1996, and August 1998. The promotional sales were treated as events; the strike and the accident could be treated as either events or interventions.

Two models were built from this data set—one for sales of men's clothing (designated as "men" in FIG. 6A) and one for sales of women's clothing (designated as "women" in FIG. 6B)—using all five predictors and three events.

Sales of men's clothing were affected only by mail, phone, strike, accident and promotional sale. By contrast, sales of women's clothing were affected by mail, print, service, strike, accident and promotional sale.

The validity of the models was tested by excluding data from July 1998 through December 1998 and using the remaining data to build the model and then using the new model to predict the data that were originally excluded. FIGS. 6A,B show that the predictions for the excluded data match the actual data very well.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

We claim:

1. A method for determining a univariate ARIMA model of a time series utilizing a computer comprising:

inputting the time series comprised of separate data values into said computer;

inputting the seasonal cycle for the time series into the computer;

determining whether the time series has any missing data values;

if any data values are missing, imputing at least one of the missing values into the time series;

determining whether the separate data values and any imputed data values of the time series are positive numbers;

if the data values are all positive, determining if logarithmic or square root transformation is needed;

if transformation is needed, transforming the time series comprised of positive separate data values and any positive imputed values;

determining the differencing order for the time series;

determining the non-seasonal AR and MA orders;

constructing an initial ARIMA model for the time series based on the differencing order and the AR and MA orders determined earlier; and modifying the initial ARIMA model based on iterative model estimation results, diagnostic checking and ACF/PACF of residuals.

2. The method of claim 1 wherein transforming the time series is comprised of a variance stabilizing transformation.

3. The method of claim 1 wherein transforming the time series is comprised of a level stabilizing transformation.

4. The method of claim 1 wherein transforming the time series is comprised of a variance stabilizing transformation and a level stabilizing transformation.

5. The method of claim 1 wherein determining the nonseasonal AR and MA orders is comprised of utilizing ACF, PACF, and EACF.

6. The method for determining the most optimum univariate model between the optimum exponential smoothing model and the optimum ARIMA model comprising:

calculating an NBIC value for each of the optimum exponential smoothing model and the ARIMA model; and selecting, as the most optimum univariate model, one of the optimum exponential smoothing model and the ARIMA model; said selected model having the smallest NBIC.

7. The method of claim 6 further comprising calculating a revised NBIC value that makes the exponential smoothing and the univariate ARIMA models comparable by eliminating effects attributable to transformation and differencing.

8. A method for determining the order of a multivariate ARIMA model of a time series utilizing a computer comprising:

inputting the time series into the computer, inputting the seasonal length for the time series into the computer;

inputting at least one category consisting of predictors, interventions and events represented by numerical values into the computer;

determining the univariate ARIMA order for the time series inputted into the computer;

determining whether the input of the categories has one or more missing values;

discarding the categories having any missing values;

transforming the positive inputted categories using the same transformation applied on the time series inputted;

differencing the inputted category using the same differencing orders applied on the time series inputted;

differencing further some inputted categories if necessary;

constructing an initial ARIMA model for the time series based on the univariate ARIMA found for the time series, the interventions and events, and the remaining predictors; and modifying the initial ARIMA model based on iterative model estimation results, diagnostic checking and ACF/PACF of residuals.

9. The method of claim 8 where transforming the time series is comprised of a variance stabilizing transformation.

10. The method of claim 8 wherein transforming the time series is comprised of a level stabilizing transformation.

11. The method of claim 8 wherein transforming the time series is comprised of a variance stabilizing transformation and a level stabilizing transformation.

12. The method of claim 8 further comprising:

(a) prior to constructing the initial model, eliminating any predictors with insignificant CCFs between the properly differenced predictor and the properly differenced time series inputted; and (b) after constructing the initial model, eliminating the predictor with all insignificant estimated coefficients wherein said predictor is eliminated one at a time after each model estimation.

13. The method of claim 8 wherein the step of constructing an initial model comprises assigning an initial ARMA model with AR and MA orders found for the time series inputted to disturbance series.

14. The method of claim 8 further comprising changing the transfer function of some predictors into a rational form with a nonempty denominator.

15. The method of claim 8 wherein the step of differencing further the inputted category comprises:

(a) for each said predictor, calculating the cross correlation function (CCF) between the already differenced predictor and the differenced time series inputted; and (b) finding the further differencing order and differencing further the category where those predictors have CCFs that are insignificant.

16. A data processing system for determining the order of a univariate ARIMA model of a time series comprising:

a computer processor;

a memory responsively coupled to said computer processor containing:

(a) a set of computer instructions for accepting data input into the memory of the time series comprised of separate data values;

(b) a set of computer instructions for accepting the input of seasonal data into a memory of the time series;

(c) a set of computer instructions for determining whether the time series has any missing data values;

(d) a set of computer instructions for imputing at least one of the missing values into the time series;

(e) a set of computer instructions for determining whether the separate data values and any imputed data values of the time series are positive numbers;

(f) a set of computer instructions for transforming the time series comprised of positive separate data values and any positive imputed values;

(g) a set of computer instructions for determining the differencing order for the time series;

(h) a set of computer instructions for constructing an initial ARIMA model for the time series based on the differencing order and the AR and MA orders determined earlier; and (i) a set of computer instructions for modifying the initial ARIMA model based on iterative model estimation results, diagnostic checking and ACF/PACF of residuals.

17. The data processing system of claim 16 wherein the set of computer instructions for transforming the time series includes computer instructions for performing a variance stabilizing transformation.

18. The data processing system of claim 16 wherein the set of computer instructions for transforming the time series includes instructions for performing a level stabilizing transformation.

19. The data processing system of claim 16 wherein the set of computer instructions for transforming the time series includes computer instructions for performing a variance stabilizing transformation and a level stabilizing transformation.

20. A non-volatile storage medium containing computer software encoded in machine readable format for determining the order of a univariate ARIMA model of a time series comprising:

(a) a set of computer instructions for accepting data input into the memory of the time series comprised of separate data values;

(b) a set of computer instructions for accepting the input of seasonal data into a memory of the time series;

(c) a set of computer instructions for determining whether the time series has any missing data values;

(d) a set of computer instructions for imputing at least one of the missing values into the time series;

(e) a set of computer instructions for determining whether the separate data values and any imputed data values of the time series are positive numbers;

(f) a set of computer instructions for transforming the time series comprised of positive separate data values and any positive imputed values;

(g) a set of computer instructions for determining the differencing order for the time series;

(h) a set of computer instructions for constructing an initial ARIMA model for the time series based on the differencing order and the AR and MA orders determined earlier; and (i) a set of computer instructions for modifying the initial ARIMA model based on iterative model estimation results, diagnostic checking and ACF/PACF of residuals.

21. The non-volatile storage medium of claim 20 wherein the set of computer instructions for transforming the time series includes computer instructions for performing a variance stabilizing transformation.

22. The non-volatile storage medium of claim 20 wherein the set of computer instructions for transforming the time series includes computer instructions for performing a level stabilizing transformation.

23. The non-volatile storage medium of claim 20 wherein the set of computer instructions for transforming the time series includes computer instructions for performing a variance stabilizing transformation and a level stabilizing transformation.

24. A data processing system for determining the order of a multivariate ARIMA model of a time series comprising:
a computer processor,
a memory responsively coupled to said computer processor containing:
(a) a set of computer instructions for accepting data input into the memory of the time series comprised of separate data values;
(b) a set of computer instructions for accepting the input of seasonal data for the time series;
(c) a set of computer instructions for accepting at least one category consisting of predictors, interventions and events represented by numerical values;
(d) a set of computer instructions for determining a univariate ARIMA model for the time series inputted into the computer;
(e) a set of computer instructions for determining whether the input of the categories has one or more missing values;
(f) a set of computer instructions for discarding the categories having any missing values;
(g) a set of computer instructions for transforming the inputted categories;
(h) a set of computer instructions for determining the differencing order for at least one of the inputted categories;
(i) a set of computer instructions for constructing an initial multivariate ARIMA model for the time series based on the differencing order and the AR and MA orders determined earlier; and
(j) a set of computer instructions for modifying the initial multivariate ARIMA model based on iterative model estimation results, diagnostic checking and ACF/PACF of residuals.

25. The data processing system of claim 24 wherein the set of computer instructions for transforming the time series includes computer instructions for performing a variance stabilizing transformation.

26. The data processing system of claim 24 wherein the set of computer instructions for transforming the time series includes computer instructions for performing a level stabilizing transformation.

27. The data processing system of claim 24 wherein the set of computer instructions for transforming the time series includes computer instructions for performing a variance stabilizing transformation and a level stabilizing transformation.

28. A non-volatile storage medium containing computer software encoded in machine readable format for determining the order of a multivariate ARIMA model of a time series utilizing a computer comprising:
(a) a set of computer instructions for accepting data input into the memory of the time series comprised of separate data values;
(b) a set of computer instructions for accepting the input of seasonal data for the time series;
(c) a set of computer instructions for accepting at least one category consisting of predictors, interventions and events represented by numerical values;
(d) a set of computer instructions for determining a univariate ARIMA model for the time series inputted into the computer;
(e) a set of computer instructions for determining whether the input of the categories has one or more missing values;
(f) a set of computer instructions for discarding the categories having any missing values;
(g) a set of computer instructions for transforming the inputted categories;
(h) a set of computer instructions for determining the differencing order for at least one of the inputted categories;
(i) a set of computer instructions for constructing an initial multivariate ARIMA model for the time series based on the differencing order and the AR and MA orders determined earlier; and
(j) a set of computer instructions for modifying the initial multivariate ARIMA model based on iterative model estimation results, diagnostic checking and ACF/PACF of residuals.

29. The non-volatile storage medium of claim 28 wherein the set of computer instructions for transforming the time series includes computer instructions for performing a variance stabilizing transformation.

30. The non-volatile storage medium of claim 28 wherein the set of computer instructions for transforming the time series includes computer instructions for performing a level stabilizing transformation.

31. The non-volatile storage medium of claim 28 wherein the set of computer instructions for transforming the time series includes computer instructions for performing a variance stabilizing transformation and a level stabilizing transformation.

32. A method for creating a univariate ARIMA model of a time series utilizing a computer wherein separate data values, seasonal cycle and seasonal length for the time series are inputted into said computer comprising:
imputing at least one missing data value when any data values are missing from the time series;
transforming the time series when the time series comprises only positive data values;
determining the differencing order for the time series;
constructing an initial ARIMA model for the time series by determining non-seasonal AR and MA orders; and modifying the initial ARIMA model.

33. The method of claim 32 wherein said imputing further comprises determining the presence of a seasonal pattern in the time series.

34. A method for creating a multivariate ARIMA model of a time series utilizing a computer wherein separate data values, the seasonal cycle and the seasonal length for the time series are inputted into said computer comprising:
   a) inputting at least one category consisting of predictors, interventions and events represented by data values into the computer;
   b) determining the univariate ARIMA order for the time series;
   c) discarding predictors having at least one missing value;
   d) transforming the predictor if the time series in b) is transformed and said predictor comprises only positive data values;
   e) differencing said predictor, intervention and event if the times series in b) is differenced;
   f) constructing an initial ARIMA model for the time series based on the univariate ARIMA found for the time series, the intervention and event, and the remaining predictor; and
   g) modifying the initial ARIMA model.

35. The method of claim 34 wherein said determining the univariate ARIMA model further comprises imputing at least one missing data value when any data values are missing from the time series, transforming the time series when the time series comprises only positive data values; determining the differencing order of the time series and determining the orders for AR and MA.

36. The method of claim 35 wherein said transforming the time series further comprises fitting a high order AR(p) model by the ordinary least squares method on the time series, the log of the time series and the square root of the time series.

* * * * *